Patented May 5, 1942

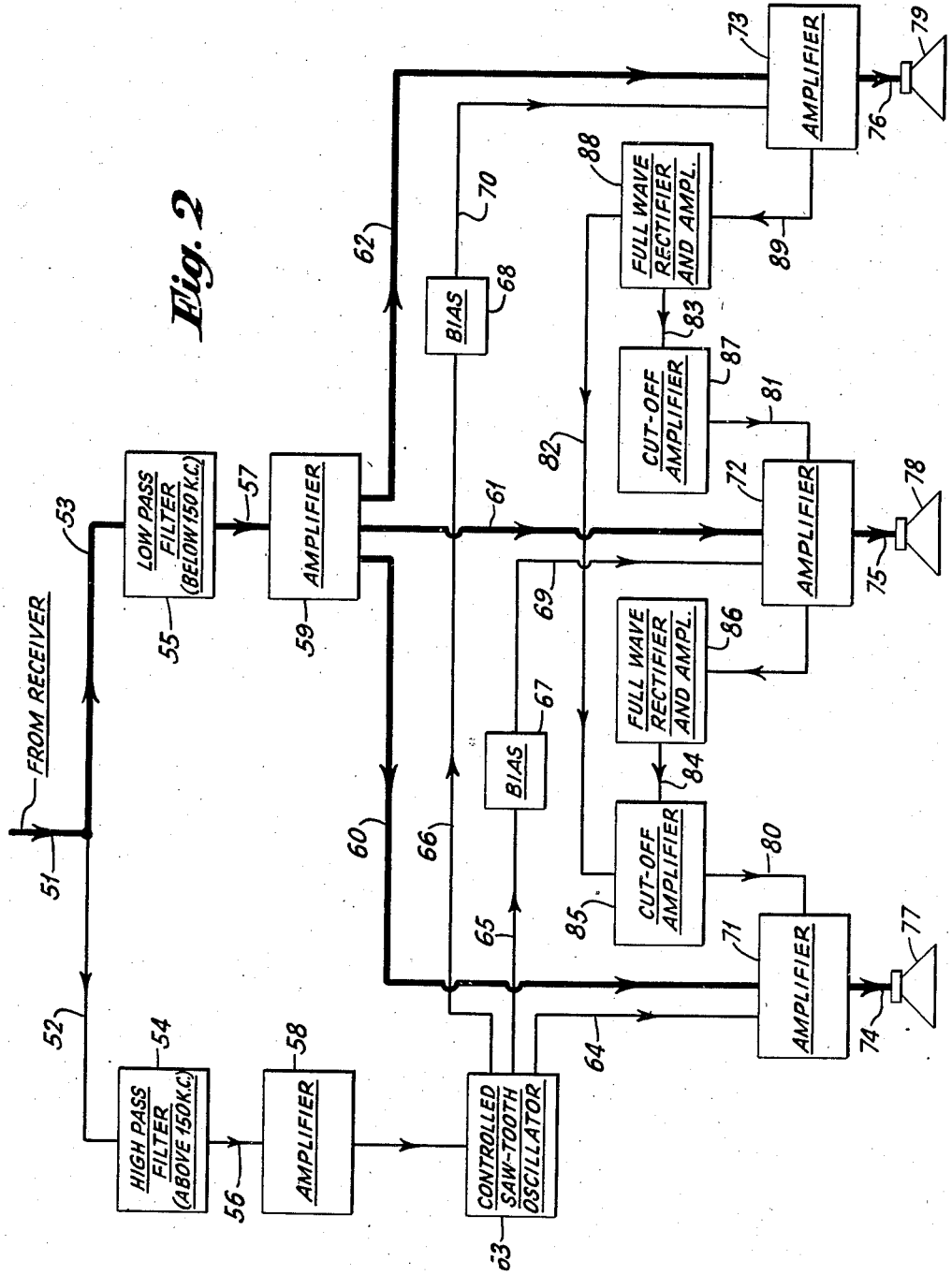

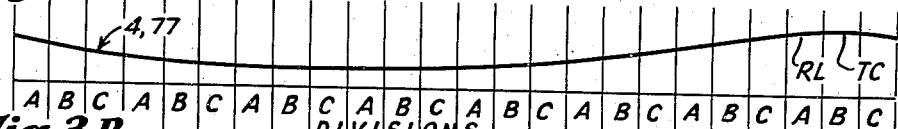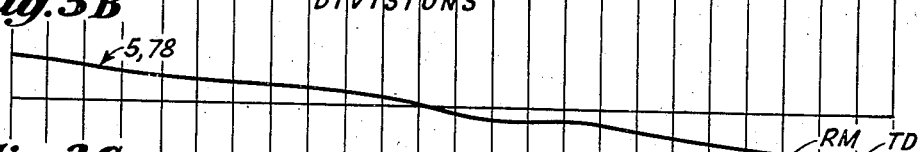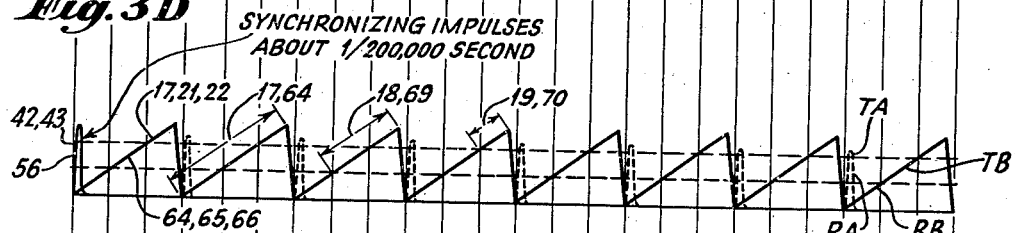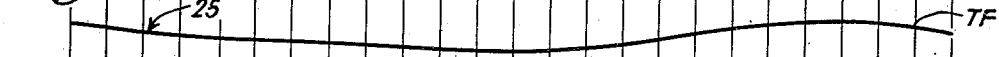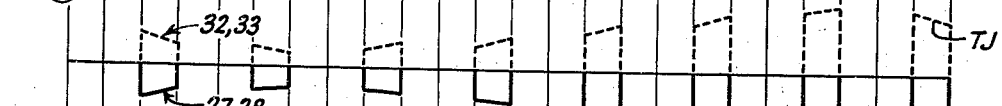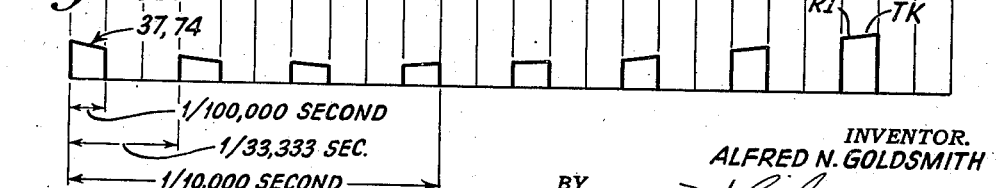

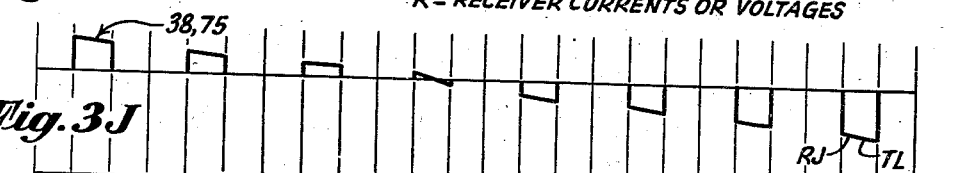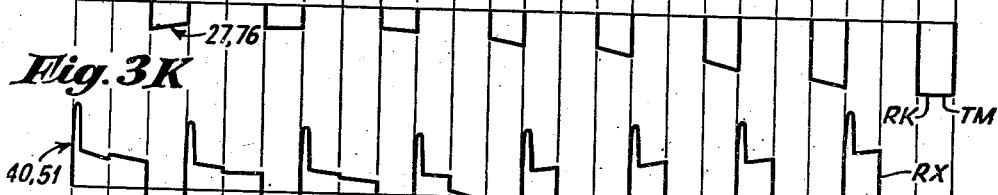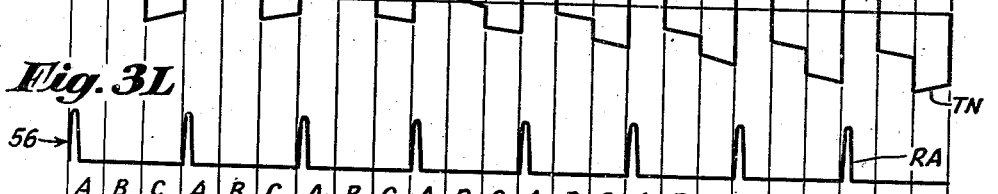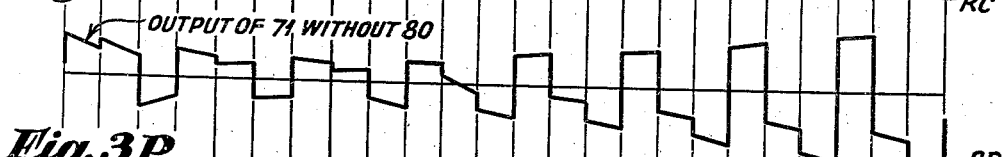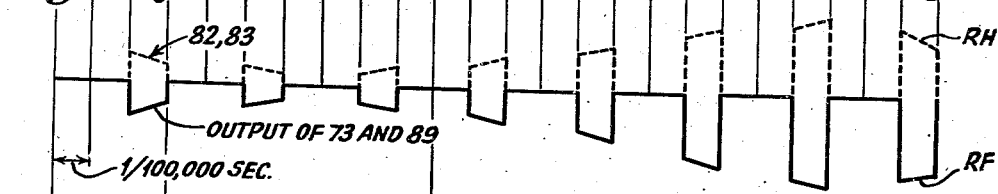

2,282,046

UNITED STATES PATENT OFFICE 2,282,046

MULTIPLEX SIGNALING SYSTEM

Alfred N. Goldsmith, New York, N. Y., assignor to Radio Corporation of America, a corporation of Delaware Application September 1, 1939, Serial No. 292,995

8 Claims. (Cl. 179—1)

My present invention relates to signaling systems of the multiplex type, and more particularly the invention relates to a method of multiphase time division in transmission and reception which is dependent on the selection of sections of a saw-tooth timing wave.

One of the primary objects of my invention is to pick-up sound from a plurality of spaced sources; to transmit the electrical version of the picked-up sound by a recurrent, or cyclic time-division of the transmission channel; and to reproduce the picked-up sound with a reasonably close approximation to the spacial differences and effects of the original sounds.

Another important object of my invention is to provide a generally useful method of multi-phase time division in transmission and reception which is dependent on the selection of sections of a recurrent saw-tooth timing wave for the first function required for time division, and to complete the time division by a system of progressive cut-offs of earlier-phased portions of the multiphase or multiplex transmission by means of energy derived from, or associated with, later-phased portions.

The novel features which I believe to be characteristic of my invention are set forth in particularity in the appended claims; the invention itself, however, as to both its organization and method of operation will best be understood by reference to the following description taken in connection with the drawings in which I have indicated diagrammatically a circuit organization whereby my invention may be carried into effect.

In the drawings—

Fig. 2 illustrates the receiver end of the system,

Figure 1:
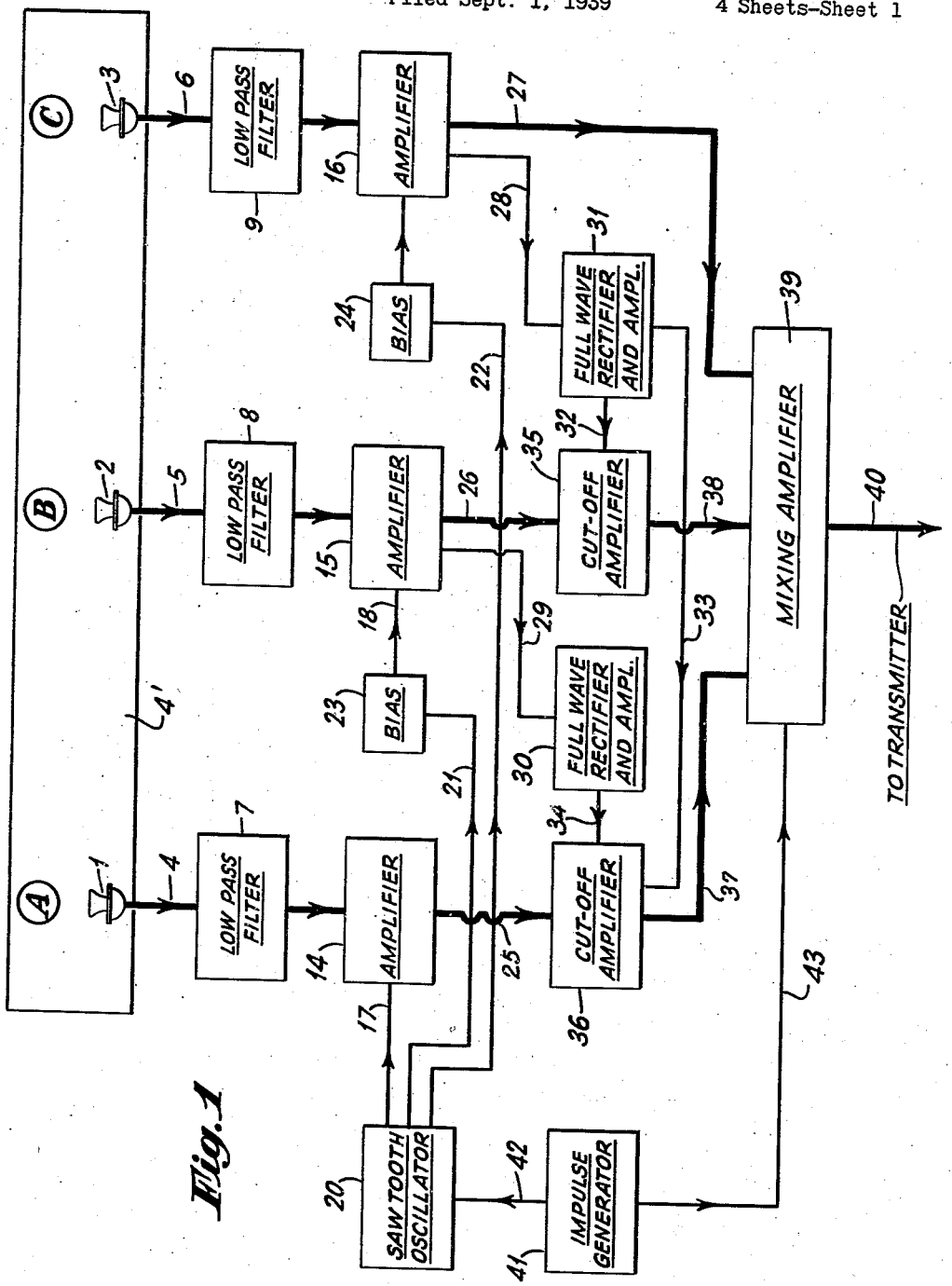
Fig. 1 shows the transmitter end of a system embodying my invention.

Figs. 3A to 3Q graphically show the operation of the various networks of the system of Figs. 1 and 2.

Referring now to the accompanying drawings, and specifically to the transmitting end of the system shown schematically in Fig. 1, numerals 1, 2 and 3 designate signal pick-up devices. Three such devices are taken illustratively, but two or any greater number may be used. While my invention is not restricted to the specific case wherein the pick-up devices are microphones, yet such illustration will be used to explain the invention. Assuming that numeral 4' denotes a stage, or platform, upon which several persons are located at positions A—B—C, microphones 1, 2 and 3 are positioned so as to pick-up sounds respectively or preferentially from the locations A—B—C. It can, also, be assumed that points A—B—C represent successive locations of one or more moving persons. The purpose of the invention is to transmit electrical versions of the sound waves from points A—B—C in accurate space relation so that the listener, at a remote point, has conveyed to him the illusion of sterosonic reproduction.

The audio frequency output of each microphone may be passed through a low-pass filter when, as in this illustration, it is desired to limit the audio range to be transmitted. Thus, filters 7, 8 and 9 are interposed in the lines leading from microphones 1, 2 and 3 respectively. Each filter has a cut-off at 10,000 cycles, for example. Those skilled in the art are fully aware of the manner of constructing such low-pass filters. The filtered audio energy is amplified, and audio amplifiers 14, 15 and 16 are associated with the output of each of filters 7, 8 and 9 respectively. Each of amplifiers 14, 15 and 16 may be any well known type of amplifier of audio energy. The amplified output of each amplifier, after suitable timed modification, is eventually impressed upon a mixing amplifier 39.

Lead 27 transmits the output of amplifier 16 directly to the mixing amplifier 39. However, the output of each of amplifiers 15 and 14 is impressed on amplifiers 35 and 36 respectively. Each of amplifiers 35 and 36 is of the so-called "cut-off" type. That is to say, each of the amplifiers 35 and 36 will be of the type wherein application of excessive, or additional, negative bias to the signal grid, or any auxiliary grid, will result in cutting off transmission through the tube and amplifier. Such amplifiers are well known, and need not be described in more detail beyond stating that the time constant or speed of operation of the biasing means for cut-off in such amplifiers must be chosen so that the cut-off will accurately follow at the highest rate the actuating potentials hereinafter described. The output of amplifier 36 is impressed on the mixing amplifier 39, as is also the output of amplifier 35. The mixing amplifier itself can be of any well known construction, and its output will be transmitted by lead 40 to any conventional transmitter equipment which customarily comprises modulator, oscillator and radiating networks.

The proper spatial relationship between the sound sources is provided by a time division arrangement now to be described. A saw tooth oscillator 20 is provided, and the frequency of the oscillator is well above audibility. Frequencies in the range from 15,000 cycles to about 100,000 cycles or more may be employed. For the purpose of illustration let it be assumed that the oscillator frequency is 100,000 cycles. The oscillator should have as gradual and linear a rise in its wave form, anad as abrupt a fall in the latter, as is obtainable. In general, saw tooth oscillators are conventional and well known, particularly in television, and those skilled in the art should readily be able to construct such oscillators. The output of saw tooth oscillator 20 is divided into the three paths 17, 21, 22 (17 being optional). The amplifier 14 is so designed and constructed that it is either operative continuously, which is preferred, or it is operative when even an extremely small voltage from oscillator 20 is supplied through lead 17. It will be understood that if the amplifier 14 is continuously operative, then lead 17 can be omitted; amplifier 14 is referred to as the "earliest-phase" amplifier. The amplifier 15, or the "intermediate-phase" amplifier, is designed to operate only when anything more than a small positive voltage is applied through connection 21. A bias source 23 is inserted in connection 21 between oscillator 20 and the signal input, or other control, electrode of amplifier 15, to apply to the input electrode a negative bias which is approximately one-third the peak voltage of oscillator 20.

Hence, during the latter two-thirds of the rising linear portion of the saw tooth wave a positive potential will be applied to amplifier 15 thereby rendering it operative. In other words, bias source 23 biases amplifier 15 to cut-off in the absence of oscillations whose amplitude exceed the predetermined value of negative bias. The bias source 24 is inserted in connection 22 so as to provide a negative cut-off bias for amplifier 16. The "latest-phase" amplifier 16 is arranged so that it operates only when anything more than a small positive potential is applied through connection 22. The bias source 24 applies a cut-off bias to the input electrode of amplifier 16 for oscillator voltage up to approximately two-thirds the peak voltage of oscillator 20. During the latter one-third of the rising linear portion of the saw tooth wave a positive potential is applied to amplifier 16 thereby rendering it operative. Now, if the outputs of amplifiers 14 and 15 were permitted to be directly applied to the mixing amplifier, equal time division between the three phases of the saw tooth wave would not be secured. This follows from the following consideration.

It will be clear that "earliest-phase" output of amplifier 14 would exist continuously. The "intermediate-phase" output of amplifier 15 would exist during the latter two-thirds of each transmission, or time-division, cycle. The "latest-phase" output of amplifier 16 would exist only during the last one-third of such transmission cycle. In order to secure the desired equal time division between the three phases networks 30 and 31 are provided, and each network comprises a full wave rectifier followed by an amplifier. Amplified audio energy from amplifier 15 is impressed upon network 30 through lead 29. The audio energy impressed on network 30 is full-wave rectified; the derived rectified audio energy is amplified, and then impressed on amplifier 36 in a sense to cut off the latter. As explained previously amplifier 36 may be of the usual audio amplifier type but with appropriate frequency characteristic and speed of cut-off, and the amplified rectified voltage output of network 30 may be applied to the signal grid of amplifier 36 in order to bias the amplifier to cut-off. Of course, any other well known method of utilizing the voltage output of network 30 may be employed for biasing amplifier 36 to cut-off. A portion of the output of amplifier 16 is applied through lead 28 to the full wave rectifier-amplifier network 31. The amplified, full-wave rectified audio energy output of network 31 is applied to the amplifier 35 in a sense to cut off the latter. Furthermore, the output of network 31 is applied over lead 33 to provide an auxiliary cut-off bias for amplifier 36.

When there is any appreciable output from amplifier 16 there can be no output from amplifiers 35 and 36, because the output of network 31 biases amplifiers 35 and 36 to cut-off. Furthermore, when there is any appreciable output from amplifier 15, there can be no output from amplifier 36 by virtue of the fact that network 30 biases amplifier 36 to cut-off. Hence, through the action of networks 36—30—35—31 the "earliest-phase" output occurs only during substantially the first third of the transmission cycle; the "intermediate-phase" output occurs substantially only during the second third of the transmission cycle; and the "latest-phase" output occurs only during substantially the last third of the transmission cycle. It should be here emphasized that the present method of producing equal time division is purely illustrative. For example, the bias source 23 may control network 30 directly. Further, bias source 24 may control the network 31 directly. In general, the equal time division arrangement utilizes "later-phases" of transmission resulting from a cycle of transmitting-time division to cut off "earlier-phases."

In addition to the time-divided outputs of the microphones, there is fed to the mixing amplifier 39 any form of synchronizing, controlling or triggering signal. For example, an impulse generator 41, operating at 33,333 cycles or impulses per second, may have its output impressed on the mixing amplifier 39 by lead 43.

The impulses from generator 41 are directly used to modulate the transmitter through lead 40. The duration of these impulses, as added to the modulation, is very brief, as for example 1/200000 or 1/300000 second. In general, the duration of each impulse should be brief in comparison with the time between impulses so as not to interfere with the earliest-phase transmission, as will appear hereafter. Hence, at the receiver they can be separated out from the complex modulation wave by a frequency-selective method. This has the advantage of simplicity and of permitting 100% modulation of the transmitter. The lead 40 will transmit to the subsequent transmitter equipment a composite wave delivered by amplifiers 36, 35, 16, as well as the impulse generator energy. The function of the impulse generator 41 is to control the oscillations produced by the saw tooth oscillator 20 so that proper time division of each audio wave is secured. This is accomplished by feeding a portion of the output of generator 41 through lead 42 to the oscillator 20, which is thus triggered and accurately time-controlled. Such saw tooth oscillators, e. g., of the relaxation oscillator type, have the characteristic of ease of timing control through such triggering means as here disclosed.

The output of the transmitter may be radiated in any desired manner; however, the modulated carrier wave may be transmitted either by radio or over a radio frequency distribution line if desired. At the receiving terminal of the system the modulated waves may be subjected to usual and well known steps to derive the modulation from the carrier. The receiving network may be of any well known type, it being understood that the final demodulator (not shown) of the network will deliver to the line 51 the composite modulation wave. A low pass filter 55, having a cut-off illustratively at about 150 k. c., transmits to amplifier 59 the composite modulated 100 k. c. wave but not the briefer synchronizing impulses. Previously it has been stated that each channel is "on" for 1/100000 second sequentially. It follows, therefore, that there is present in the signaling circuit a wave having 100,000 individual and adjacent elements per second, each such element in sequence being from a different channel, and, accordingly, forming in their totality a "composite modulated 100 k. c. wave". The filter 54 is a high pass filter, and passes the impulse energy of 200 k. c. or above. The filters 54 and 55 may be of any well known type, and those skilled in the art are fully aware of the manner of designing filters of these types.

The 200,000 or higher cycle impulses are separated out from the composite modulation wave (Fig. 3K) by selector filters 54 and 55. The method employed may follow that shown on page 289 (Figs. 11–13) of "Television," vol. I, July 1936 (published by RCA Institutes, Technical Press, New York city). The latter is merely a modified frequency-selective method. The specific values given herein for the synchronizing impulses and saw tooth oscillator are purely illustrative. The greater the difference between the length of a section of the composite audio wave RC (Fig. 3M) on the one hand, and the shorter the length of the synchronizing impulses TA or RA (Figs. 3D and 3L) on the other hand, the easier will be the effective and economical separation of these two components of the wave modulation at the networks 54 and 55 of the receiver.

The impulse modulation energy is amplified as required by amplifier 58. The impulses are applied to controllable saw tooth oscillator 63 so as to control the latter in the same manner as described in connection with generator 41 and oscillator 20 in Fig. 1. The amplified output of amplifier 59 is transmitted into three channels. One channel comprises lead 60, amplifier 71 and sound reproducer 77; the second channel includes lead 61, amplifier 72 and reproducer 78; the third channel comprises lead 62, amplifier 73 and reproducer 79. The reproducers may be loudspeakers of any desired type. They are spaced in such a manner as to create the desired spatial relations, or the illusion thereof, corresponding to the positions of microphones 1, 2 and 3. By way of illustration, the loudspeakers 77, 78, 79 may be located on a stage similar to platform 4' of Fig. 1, and the speakers can be arranged to correspond to points A—B—C. The sound waves issuing from the loudspeakers are desired to be in the same phase and wave-form relationship as the sound waves at the microphones. The circuit now to be described provides the means for "analysis" of the composite wave RC of Fig. 3M into the wave patterns at Figs. 3H—3I—3J.

This is necessary in order to separate and select the individual channel signals which are derived from the multiplex reception, all in the fashion also decribed in connection with a later description herein of Figs. 3A to 3Q. The saw tooth oscillator 63 is constructed as nearly as is possible to be identical in operation with oscillator 20 in frequency, phase, slopes, and linearity of rising and falling portions of its generated wave. The output of oscillator 63 is impressed on amplifiers 71, 72, 73 by connections 64, 65 and 66 respectively. Amplifier 71 is constructed and arranged to be active whenever there is any potential of positive polarity applied to its signal grid. If desired, connection 64 may be omitted, a small constant positive activating potential being then continuously applied to amplifier 71. The bias source 67 is included in connection 65, and applies a negative voltage to the signal grid of amplifier 72, and the value of the negative bias is equal to one-third of the peak voltage of oscillator 63. Hence, the amplifier 72 is operative during the latter two-thirds of each transmission cycle as defined above. The bias source 68 is included in connection 66; the bias magnitude is equal to two-thirds of the peak voltage of oscillator 63. Amplifier 73 will then be operative during the last third of each transmission cycle. The three amplifiers 71, 72, 73 have similar characteristics, and function in the manner of controlled amplifiers 14, 15 and 16 of Fig. 1.

A portion of the output energy of amplifier 73 is applied to the network 88. The latter is a full wave rectifier and amplifier of the type described in connection with Fig. 1. The output of network 88, which is amplified full wave, rectified voltage, is applied as grid bias to a pair of cut-off amplifiers 87 and 85. Lead 83 applies the cut-off bias to amplifier 87, while lead 82 applies the cut-off bias to amplifier 85. Each of the cut-off amplifiers 87 and 85 is designed so that transmission of energy therethrough is prevented when a small biasing voltage is applied over leads 82 and 83. The output of cut-off amplifier 87 is applied to amplifier 72 by lead 81, while lead 80 feeds the output of amplifier 85 to a control element of amplifier 71. The full wave rectifier-amplifier network 86 rectifies a portion of the voltage of the amplifier 72; the amplified rectified voltage is applied over lead 84 to a control element of cut-off amplifier 85. The received audio-frequency sections (or phases) of energy are distributed to the loudspeakers 77, 78, 79 in appropriate time relationship to the sub-division of the transmitting cycle at the transmitter as between the audio frequency outputs of the three correlated microphones 1, 2, 3.

It is necessary to utilize full wave rectifiers for networks 30, 31, 86 and 88 in Figs. 1 and 2. The reasons for use of full wave rectifiers will be explained at a later point in connection with the description of Figs. 3F, 3G, 3P and 3Q. During the active periods of the controlling waves represented in these figures they must cause the cut-off of all earlier waves, and the important point is that they must do this irrespective of their polarity. That is, the negative polarity variations of wave TG, for example, (Fig. 3F) must be as effective in producing cut-off as are those variations which are of positive polarity. For this reason full wave rectification is employed in connection with the aforesaid networks.

Figs. 3A to 3Q inclusive serve to render the function of the transmitter and receiver networks more clearly understood. It is to be understood that the various curves shown in these figures are plotted on the same scale, and for that reason the curves are to be understood as if plotted with the same ordinates and abscissae upon one curve sheet. Each of the curves has associated with it the letter T to designate that the curve pattern exists at the transmitter, and the letter R to designate that the curve pattern exists at the receiver. Furthermore, each of the curves has associated with it numerals corresponding to similar numerals designating conductors in Figs. 1 and 2 so that it can readily be determined at which portion of the systems shown in Figs. 1 and 2 the particular wave patterns shown in Figs. 3A—3Q exist. It will, also, be noted that certain of the wave patterns are duplicated in the transmitting and receiving systems. Hence, by following through Figs. 3A to 3Q inclusive, it is possible to have a clear picture of the manner in which the various networks of the system function to change the nature of the waves transmitted therethrough.

Figs. 3A, 3B and 3C show respectively small sections of an audio wave impressed on microphones 1, 2 and 3 respectively and passing through leads 4, 5 and 6, and necessarily on a much expanded horizontal time scale. It will be understood that the three curves TC, TD and TE are simultaneous representations of sections of audio patterns simultaneously passing through leads 4, 5 and 6 in the transmitter of Fig. 1. It will be noted further that the curves are divided into recurrent divisions A, B and C, each of which divisions in this illustrative case is 1/100,000 second in duration. The complete A, B, C group, or cycle, will than have a duration of 1/33,333 second. Fig. 3D illustrates, by means of curve TB, the wave form of the saw tooth oscillator 20, and it will be noted that each saw tooth cycle has a duration of the group or cycle A, B, C. Additionally, the letters TA denote the synchronizing impulses having a duration of about 1/200,000 second. The impulse generator 41, as those skilled in the art are fully aware, is constructed to produce impulses having a duration of 1/200,000 second, or less, and spaced apart a period of time equal to the period A, B, C which is taken as 1/33,333 second.

Fig. 3D, furthermore, shows the fact that the saw tooth oscillation impulses are transmitted over leads 17, 21 and 22, but that the oscillator is operative over lead 17 throughout its entire cycle, whereas it is operative for only 2/3 of its cycle over lead 18, and it is operative for only 1/3 cycle over lead 19. The effect of the saw tooth oscillator, and biasing networks 23 and 24, on the wave forms TC, TD and TE is shown in Figs. 3E, 3F and 3G.

Fig. 3E shows curve TF substantially corresponding to that of curve TC, and indicates that TF is the true wave form at lead 25. This is true since the saw tooth oscillations are constantly operative over lead 17. However, Fig. 3F shows in the full line curves the effect at leads 26 and 29 (TG) of the biasing path 18. Since the saw tooth cycle is operative at lead 18 for only 2/3 of its duration, then it will be clear that the first 1/3 of the wave form in each saw tooth cycle has been chopped out. Similarly, in Fig. 3G there is shown in full line the curve TH showing the nature of the wave form at the leads 27 and 28. It will be seen that this wave form is due to the fact that the saw tooth oscillator is only operative during the last 1/3 of each saw tooth wave cycle A, B, C. In Fig. 3F the dotted curves TI denote the effect of the full wave rectification, and the additional fact that at lead 34 the wave form has the shape of the dotted curves. In Fig. 3G it is shown that at leads 32 and 33 the dotted line wave form TJ exists. In this way, the cut-off amplifiers are operated by the networks 30 and 31 regardless of the polarity of the energy passing through to the rectifier networks. The reason for full wave rectification, with resulting cut-off action regardless of the polarity of the controlling wave as desired, thus becomes clear.

Figs. 3H, 3I and 3J show the wave forms TK, TL and TM respectively which exist at leads 37, 38 and 27 respectively. In other words, Fig. 3H shows the manner in which the curve TF of Fig. 3E has been chopped up by the action of networks 30 and 31. On the other hand, Fig. 3I shows how curve TG of Fig. 3F has been further chopped up or divided into phased sections by the action of network 31. It will now be seen that the three original audio wave forms have been chopped up according to the time divisions A, B and C, but that each of curves TK, TL and TM represents the original audio envelope of the corresponding pick-up and channel. Finally, Fig. 3K shows the composite modulation wave form TN which exists at lead 40, and includes the synchronizing impulses.

The curve TN of Fig. 3K represents the modulation wave form placed on the transmitter carrier wave. The form of the wave is a composite of curves TK, TL, TM and TA. Actually, of course, the complete modulated carrier wave requires the combination of TN with its mirror image, to form the envelope curve of the modulated radio frequency carrier in the transmitter, in order to get an accurate picture of the modulated carrier wave. The complex wave form TN, then, is transmitted to the receiver point. At the latter the modulated carrier is selected, amplified and demodulated in the usual manner. For example, the stages prior to lead 51 in Fig. 2 may be the usual stages of a superheterodyne receiver up to and including the second detector. The modulation wave form at lead 51 is the same curve as TN of Fig. 3K; the symbol RX denotes that fact. It is, also, noted in Fig. 3K, beneath numeral 40, that numeral 51 designates the portion of the receiver system where the form RX exists.

Fig. 3L shows the synchronizing impulse curve form RA which is found at lead 56 at the output of high pass (impulse selector) filter 54. Comparison of this curve with Fig. 3D shows that the synchronizing impulses are recovered in accurate relation relative to the periods A, B, C. From Fig. 3M it is seen that the wave form at lead 57, as well as at leads 60, 61, 62, is represented by the curve RC. In other words, the low pass filter 55 passes the composite of curves TK, TL, TM, but without including the synchronizing impulses. The problem now is to "analyze" the wave form RC into the component forms RI, RJ and RK of Figs. 3H, 3I, 3J respectively. From the latter figures it will be seen that these component wave forms exist at leads 74, 75 and 76 respectively. When the reproducers 77, 78 and 79 are respectively actuated by the impulses RI, RJ, RK, there will result the audio wave forms RL, RM and RN respectively. These, it will be recognized, are the original audio wave forms of Figs. 3A, 3B and 3C.

The "analysis" of curve form RC is accomplished by producing saw tooth oscillations RB (Fig. 3D) which correspond to those produced at 20 in Fig. 1. The synchronizing impulses RA (Fig. 3L) maintain the wave forms RB and TB in accurate synchronism. This is done by applying the impulses at 58 to the oscillator 63. The saw tooth oscillations are effective continuously at leads 64, 65, 66. However, due to the bias sources 67 and 68, the oscillations are effective at lead 69 for the latter two-thirds of the saw tooth wave cycle and at lead 70 are effective for only the last one-third of the cycle. This is shown in Fig. 3D; it is, also, shown that the absence of a biasing means in lead 64 permits continuous effect of the oscillations. It will be noted that this is the same type of control effected in Fig. 1.

Considering, now, Fig. 3N it will be readily appreciated that curve RD will be secured at the output of amplifier 71 if the cut-off voltage from amplifier 85, and which voltage is fed over lead 80, is absent. This curve RD is similar to curve RC of Fig. 3M. However, at the output amplifier 72, and without considering the action of the cut-off voltage fed over lead 81, the wave form is that of the full line curve RE of Fig. 3P. Due to the action of the oscillator voltage fed over lead 69, and which is only effective during two-thirds of the cycle, the "A" period has been chopped out. Similarly, at the output of amplifier 73, and at lead 89, the wave form is as shown by the full line curve RF in Fig. 3Q. Due to the one-third effectiveness of the oscillator voltage at lead 70, the "A" and "B" sections of the curve RC have been chopped out.

The action of the full wave rectifier-amplifier 86 on the curve shape RE is shown by the dotted line curve RG in Fig. 3P. Again, the full wave rectification action of network 88 on curve form RF is shown by the dotted line curve RH in Fig. 3Q. In other words, the curve RG is the wave form at lead 84, and the curve RH illustrates the wave form at leads 82 and 83. The cut-off bias fed over lead 82 causes amplifier 71 to be inoperative during each "C" period; the cut-off bias fed over lead 83 causes amplifier 72 to be inoperative during each "C" period. Furthermore, the cut-off bias fed over lead 84 causes amplifier 71 to be inoperative over each "B" period. The total result is, then, that at the output lead 74, 75 and 76, the curve forms are RI, RJ and RK (Figs. 3H, 3I, 3J) respectively.

It will now be seen that the audio waves produced at reproducers 77, 78 and 79 are not only of the same form as the waves impressed at microphones 1, 2 and 3, but they have the same relative phase relationship. Hence, at the reproducers there is created a sterosonic illusion. It may be added that, if delays in the control circuits of Figs. 1 and 2 have an appreciable effect, they can be equalized and compensated as desired by the insertion of well known non-frequency selective delay networks in one or more of the elements 42, 43, 17, 21, 22, 28, 33, 32, 29, 56, 64, 65, 66, 89, 92, 84, 80 or the like. The term "non-re-entrant wave" used in the claims means a wave which, for each cycle, cannot be cut by a horizontal line (parallel to the zero axis of abscissae) in more than two points of the wave outline.

Detailed analysis of the time selection produced by the system as described herein indicates that during portion B of the saw tooth wave cycle, and during the brief and rapidly falling portion thereof, it is possible for a short section or "burst" of energy to pass through conductor 38 to mixing amplifier 39 in Fig. 1, the amplitude of this brief section being proportional to the momentary amplitude of the wave generated from 2 and 15. Inasmuch as such a brief section of electrical energy might sufficiently resemble one of the impluses contributed to mixing amplifier 39 by impulse generator 41, thus disturbing the synchronizing means used in the system as disclosed, any one of the following means may be used to eliminate this generally unimportant effect. As a first means, there may be inserted in conductor 38 a lowpass filter with a cut-off of approximately 150,000 cycles per second. Thus brief sections of electrical energy are prevented from passing through 38 to amplifier 39. Alternatively, cut-off amplifier 35 may be designed to amplify frequencies up to say 150,000 cycles but not beyond, thus preventing any briefer sections of electrical energy from passing therethrough.

While I have indicated and described a system for carrying my invention into effect, it will be apparent to one skilled in the art that my invention is by no means limited to the particular organization shown and described, but that many modifications may be made without departing from the scope of my invention, as set forth in the appended claims.

What I claim is:

1. In combination with a plurality of audio signal transmission channels, the signals of the channels being different, a saw tooth oscillator, separate connections from said oscillator to said channels for controlling signal transmission therethrough, a timing impulse generator, means responsive to said impulse generator for controlling said oscillator, means in circuit with the oscillator and at least one of the channels for preventing transmission through the one channel during transmission through the remaining channels, and additional means responsive to signals in said one channel for preventing transmission through the remaining channels during periods of transmission through the one channel.

2. In combination, means for the production of a multiplicity of intelligence-carrying signals, means for initiating cycles of successively selected time sections respectively of each of said signals, such cyclic groups of time sections being each brief in comparison with the shortest half-wave cycle of any of the said signals, a timing impulse generator for producing cyclically-repeated, variable amplitude impulses with each impulse brief in duration in comparison with each of the selected time sections, means responsive to said impulses for initiating operation of said time section selection means, and means for simultaneously transmitting the cyclically repeated initiating impulses and the cycles of time sections of each of the said signals in superimposed relation.

3. In combination with means for producing and transmitting a composite signal composed of cycles of successively selected time sections respectively of a multiplicity of intelligence-carrying signals wherein the cyclic groups of sections are brief in comparison with the shortest half-wave cycle of any of said signals and superimposed cyclically repeated impulses which are brief in comparison with each of the said selected time sections, means for receiving said composite signal, means responsive to the frequency and wave shape of said impulses for separating the impulsive components of the received composite signal, means initiated by the separated impulses for selecting individually corresponding time sections of each of the intelligence-carrying signals, and means for individually reproducing each such selected signal from such selected time sections of each individual signal.

4. In a system of multiplex communication, the method which includes generating a composite signal including cyclically recurrent and timed sections of each of a multiplicity of intelligence-carrying signals, such cyclic groups of sections being brief in duration compared with the shortest half-wave cycle of any of the said signals, and concurrently superimposing on said timed sections impulsive signals for the initiation and timing of each of such above mentioned cyclic groups of sections, such impulsive signals being brief in comparison with the shortest of the timed sections of any of the intelligence-carrying signals.

5. In combination with means for producing a plurality of independent audio signals, means for initiating cycles of successively selected time sections respectively of each of said signals, said cyclic groups of time sections being each brief in comparison with the shortest half-wave cycle of any of said audio signals, means for providing impulses brief in duration in comparison with each of the selected time sections, means utilizing said impulses for effecting operation of said time section selection means for each selection cycle, and means for simultaneously transmitting the cyclically repeated initiating impulses and the cycles of time sections of each of the audio signals in superimposed relation.

6. In combination with means for producing a plurality of independent audio signals, means for initiating cycles of successively selected time sections respectively of each of said signals, said cyclic groups of time sections being each brief in comparison with the shortest half-wave cycle of any of said audio signals, means for providing impulses brief in duration in comparison with each of the selected time sections, means utilizing said impulses for effecting operation of said time section selection means for each selection cycle, means for simultaneously transmitting the cyclically repeated initiating impulses and the cycles of time sections of each of the audio signals in superimposed relation, means for receiving said simultaneously transmitted impulses and time sections at a point remote from the signal producing means, means initiated by the impulsive components of the received signals for selecting individually corresponding time sections of each audio signal, and means for individually reproducing each such selected signal from such selected time sections.

7. In combination with a plurality of audio signal transmission channels, the signals of the channels being of different wave form, means for producing a control wave of predetermined shape, connections between said means and channels for applying said wave to said channels for controlling signal transmission therethrough in a predetermined cyclic sequence, means in circuit with the said means and at least one of the channels for preventing transmission through the one channel during transmission through the remaining channels, and additional means responsive to signals in said one channel for preventing transmission through the remaining channels during periods of transmission through the one channel.

8. In combination with a plurality of signal transmission channels, the signals of the channels being of different wave form, a saw-tooth oscillator for producing a control wave, connections between the oscillator and channels for applying said control wave to the channels for controlling signal transmission in a predetermined cyclic sequence, means for producing timing impulses, means responsive to said timing impulses for controlling the oscillator, means responsive to the oscillator control wave for preventing transmission through one channel during transmission through the remaining channels, and additional means responsive to signals in said one channel for preventing transmission through the remaining channels during periods of transmission through said one channel.

ALFRED N. GOLDSMITH.